Aug. 23, 1932.  R. T. WISE  1,872,862
CONSTANT MESH GEAR ELECTRIC MOTOR TRANSMISSION
Filed June 6, 1928  2 Sheets-Sheet 1
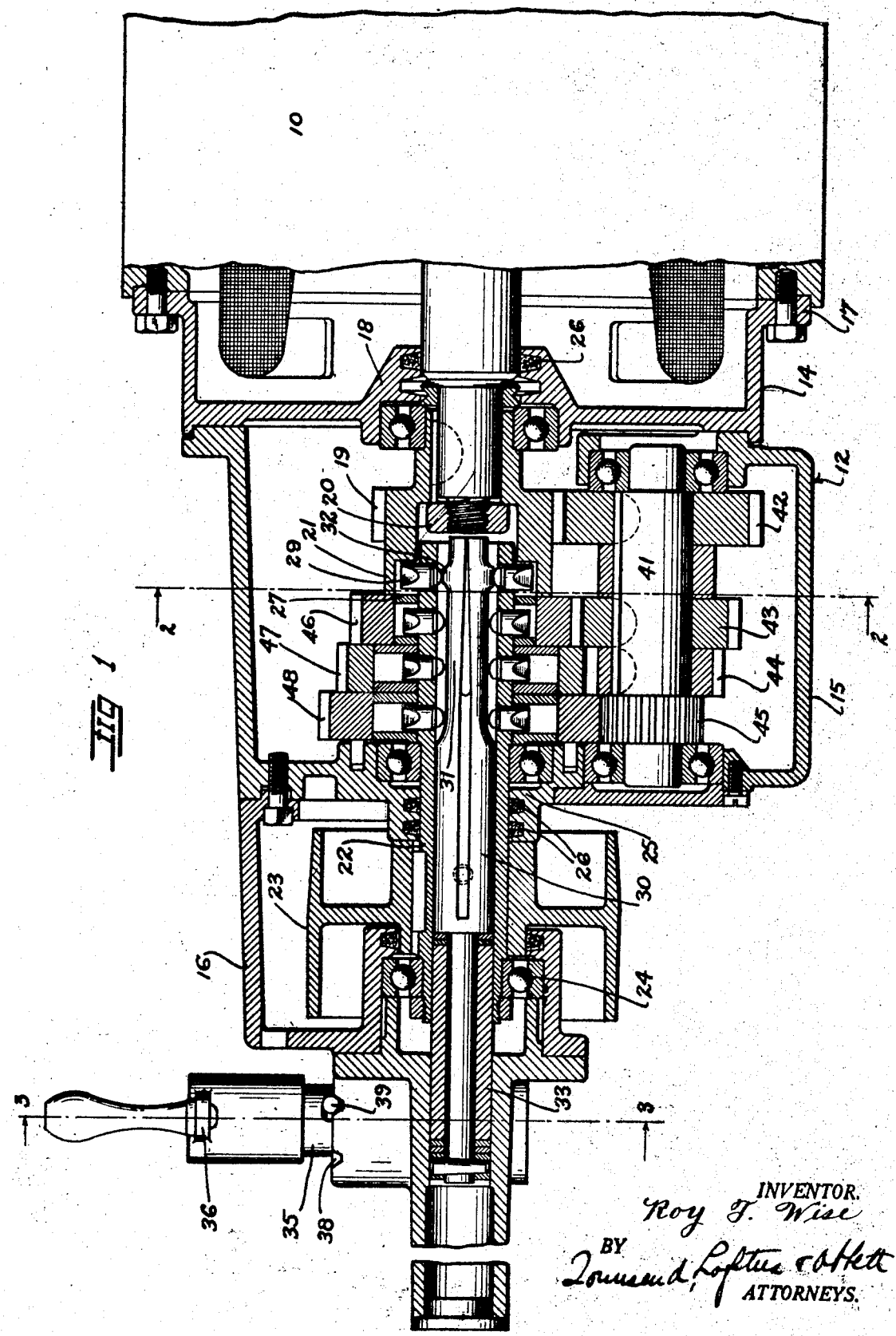

Aug. 23, 1932.  R. T. WISE  1,872,862
CONSTANT MESH GEAR ELECTRIC MOTOR TRANSMISSION
Filed June 6, 1928  2 Sheets-Sheet 2
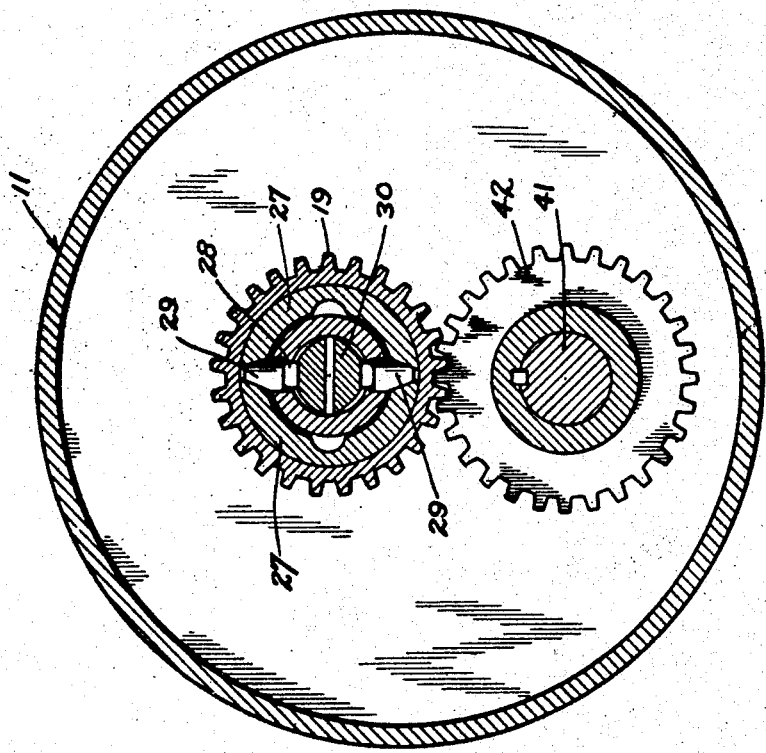
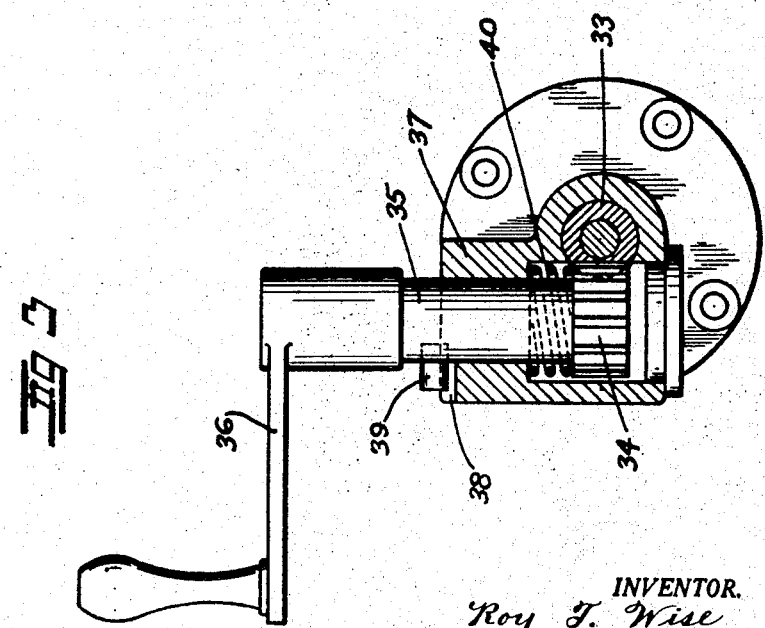
INVENTOR.
Roy T. Wise
BY
Townsend, Loftus & Abbott
ATTORNEYS.

Patented Aug. 23, 1932

1,872,862

UNITED STATES PATENT OFFICE

ROY T. WISE, OF BERKELEY, CALIFORNIA, ASSIGNOR, BY MESNE ASSIGNMENTS, TO WISE PATENT AND DEVELOPMENT COMPANY, OF NEW YORK, N. Y., A CORPORATION OF DELAWARE

CONSTANT MESH GEAR ELECTRIC MOTOR TRANSMISSION

Application filed June 6, 1928. Serial No. 283,248.

This invention relates to transmissions and particularly pertains to a variable speed transmission for electric motors.

It is the principal object of the present invention to provide a generally improved and simplified transmission of the character referred to by providing a transmission which may be directly assembled on the frame of a motor and wherein the transmission gears are in constant mesh but capable of being selectively placed in operation to drive the driving element of the transmission at various speeds while the motor speed remains constant.

In carrying out the invention into practice, my improved transmission is assembled directly on the motor frame at the drive end of the motor shaft. Transmission gears which are in constant mesh are associated with the motor shaft and with a driving element to drive the latter at different speeds relative to the motor shaft speed when the gear mechanism is placed in operation. The gears of the transmission may be selectively placed in operation through the medium of a clutch mechanism to create a drive at a desired speed ratio between the motor shaft and driving element.

One form which the invention may assume is exemplified in the following description and illustrated by way of example in the accompanying drawings, in which:

Fig. 1 is a central vertical section through a transmission embodying the preferred form of my invention and disclosing it as assembled on an electric motor.

Fig. 2 is a transverse section through the transmission taken on line 2—2 of Fig. 1.

Fig. 3 is a sectional view taken on line 3—3 of Fig. 1.

Referring more particularly to the accompanying drawings, 10 indicates a standard design of an electric motor having the usual frame upon which my improved transmission 11 is adapted to be assembled.

The transmission here disclosed is constructed so that it may be assembled on electric motors of standard design without altering the latter to any great extent. It is only necessary to remove one end plate from the motor and alter the drive end of the motor shaft to accommodate certain of the elements of the transmission.

The transmission includes a casing 12 here shown as formed in three rigidly connected sections 14, 15 and 16. The casing section 14 is formed with a flange 17 having bolt holes formed therethrough which align with tapped holes in the end of the motor frame, so that cap screws may be utilized to securely connect the transmission to the motor frame in proper alignment with the shaft of the motor. The three sections 14, 15 and 16 of the transmission casing are rigidly connected by bolts or other suitable means.

The casing section 14 is formed with a bearing 18 for the end of the motor shaft. This shaft projects through the bearing 18 to a point within the casing section 15. A drive gear 19 is keyed on to the motor shaft within the casing section 15, a nut 20 being provided at the end of the shaft to collar the gear 19 in place. This gear 19 is formed with a counterbored axial extension 21 which constitutes a clutch part as will be hereinafter described.

Arranged in axial alignment with the motor shaft is a hollow drive shaft 22 at the outer end of which is secured a driving element 23 which may be either a pulley as illustrated or other type of driving member. This pulley 23 is disposed within the casing section 16, one side of which is open so that a belt may be mounted on the pulley 23 to transmit the drive. In some instances I substitute a sprocket gear for the pulley 23 so that a chain drive may be provided to the machine being driven.

From Fig. 1 it will be seen that the outer end of the drive shaft 22 is mounted in an anti-friction bearing 24 carried by the end of the casing section 16. A bearing 25 is also provided between the casing sections 15 and 16 to receive the drive shaft 22.

Felt washers 26 are provided adjacent each bearing 18, 24 and 25 to prevent lubricant from escaping from the parts being lubricated. I intend that the gears mounted within the casing section 15 be run in lubricant and it is therefore essential that the lubricant be confined and not permitted to escape either along the drive shaft 22 or the motor shaft.

To transmit a direct drive from the motor shaft to the drive shaft 22 I have provided friction clutch means for clutching the gear 19 to the drive shaft 22, thereby directly connecting the drive shaft 22 to the motor shaft. Reference being had to Fig. 2 it is seen that this clutch means comprises a pair of semi-circular clutch shoes 27 which are arranged within the counterbore of the axial extension 21 of the gear 19. The exterior surface of the clutch shoes 27 are turned so as to be snugly received within the counterbore of the gear, while the inner surfaces of the shoes are turned to allow play between the drive shaft 22 and the shoes, as shown. The ends of these shoes, however, are cut-away to form tapered sockets between the ends of the shoes.

The drive shaft 22 is formed with radial pockets 28 in alignment with the tapered sockets. A clutch element 29 is disposed in each pocket of the drive shaft 22. These clutch elements 29 have tapered outer ends coinciding with and projecting into the tapered sockets between the ends of the clutch shoes 27. Therefore, it is obvious that when these tapered clutch elements 29 are forced outwardly in a radial direction they will expand the clutch shoes 27, causing them to tightly grip the gear 19 and clutch it to the drive shaft 22. When these clutch elements 29 are permitted to move inwardly the clutch shoes 27 will contract and release the gear 19.

To operate the clutch elements 29 to render the clutch effective and ineffective, I have provided a clutch operating shaft 30 extending co-axially through the drive shaft 22. This clutch shaft is reduced in diameter at its forward end and split longitudinally as indicated by the numeral 31 to render it resiliently yieldable and at a point 32 it is increased in diameter to form a high point for forcing the clutch elements 29 outwardly. Therefore, by reciprocating the clutch operating shaft 30, the clutch mechanism intermediate the drive shaft 22 and the gear 19 will be rendered effective or ineffective as desired. That is to say, when the high point 32 of the clutch operating shaft 30 is in register with the clutch elements 29, the latter will be yieldingly forced outwardly expanding the clutch shoes 27 and clutching the gear 19 with the drive shaft 22. When the high point 32 of the clutch operating shaft 30 is moved out of register with these clutch elements 29 they will move inwardly permitting the clutch shoes to contract and release the gear 19 from the drive shaft 22.

From the foregoing, it will be evident that the particular type of friction clutch disclosed herein will substantially eliminate or diminish the transmission of stresses incident to torque radially to the clutch actuating rod 30, due to the arrangement of the radially movable wedge pins 29, and as a result thereof the resiliently yieldable actuating rod 30 can ably withstand what little forces are transmitted by the clutch mechanism back to the split actuating rod 30, so as to be able to normally urge the radially movable wedges outwardly to automatically compensate for wear occurring between the clutch parts. This particular type of friction clutch is new per se, and gives rise to new and better results in transmission mechanisms. This type of friction clutch enables the use of constantly meshing gears in a transmission, and provides an arrangement which is absolutely noiseless in shifting from one gear to the other, while at the same time providing for the requisite flexibility. This much is true of many friction clutches, but in such clutches, there is no provision for automatically compensating for wear between the clutch parts. Due to the inherently resilient split clutch operating rod 30, the wear incident in clutch parts is automatically taken care of and, therefore, does not necessitate removal of any part of the transmission housing or any manual adjustment whatsoever for compensating for wear in clutches associated with this type of transmission.

To operate the clutch control shaft 30, at its outer end it is formed with a quill 33 which is secured thereon against endwise movement. The provision of this quill permits the control shaft 30 to revolve in unison with the drive shaft 22 while the quill 33 remains stationary. At one side, this quill is formed with a plurality of rack teeth (see Fig. 3) which are in mesh with a pinion 34 secured on a shaft 35. This shaft is journalled at the outer end of the casing section 16. At its outer end this shaft 35 is fitted with a shifting crank 36 for revolving the pinion 34 and thereby shifting the clutch control shaft 30.

The bearing 37 in which the shaft 35 is revoluble is formed at one end with a plurality of spaced notches 38 which are adapted to be engaged by a protrusion 39 projecting from the shaft 35. A spring 40 constantly tends to force the shaft 35 inwardly, yieldably maintaining the protrusion 39 in engagement with one of the notches 38. These notches are spaced apart to correspond with the different positions of the high point 32 of the clutch control shaft 30, so as to yieldably maintain the control shaft in any one of its set positions. The bearing extension member 37 is shaped so as to act as a closure for the outer end of the control shaft 30 and the quill 33, and has an annular flange 60 arranged to fit against the outer end of the section 16. The flange 60 has extended inwardly thereof a hub 61 which projects into the section 16 to engage the bearing 24 and assist in maintaining the pulley 23 and its associated parts in position. The inward movement of the extension member 37 is limited by the abutting engagement of the flange 60 with the adjacent wall of the section 16. The extension member 37 is detachably connected to the section 16 through the instrumentality of threaded bolts which extend through the openings 62 (Fig. 3) and corresponding openings formed in the section 16.

While I have but described but the direct drive speed of the transmission, there are three additional speeds which are also controlled in the same manner as described in connection with the direct drive. The other three speeds are arranged to progressively increase the ratio between the motor and the driving pulley 23.

To provide the three additional speeds mentioned a countershaft 41 is journalled at its ends at an eccentric position within the transmission casing section 15. A gear 42 is keyed on the countershaft 41 and is in constant mesh with the gear 19 so that a drive will be constantly transmitted to the countershaft. Also keyed on the countershaft are three pinions 43, 44 and 45 which progressively decrease in diameter. These pinions 43, 44 and 45 mesh with gears 46, 47 and 48 which progressively increase in diameter and are normally revolubly mounted on the drive shaft 22. That is, the pinion 43 is in constant mesh with the gear 46 on the drive shaft. The pinion 44 on the countershaft is in constant mesh with the gear 47 on the drive shaft and the pinion 45 is in constant mesh with the gear 48 on the drive shaft.

Each of the gears 46, 47 and 48 are fitted with a clutch mechanism exactly the same in construction as that described in connection with the gear 19. These clutch mechanisms are all operated by the clutch control shaft 30 in the same manner as that previously described. Therefore, when the high point 32 of the clutch control shaft 30 is in register with any one of the clutch mechanisms of the gears 46, 47 and 48 it will be clutched to the drive shaft and a drive will be transmitted from the motor shaft through the countershaft to the drive shaft through the selected set of gears.

In operation of the device, it is constructed and assembled as shown in the drawings and normally the high point 32 on the clutch control shaft 30 is in a neutral position. To form a direct drive between the motor shaft and the pulley 23, the crank 36 is operated to place the clutch control shaft 30 in register with the clutch mechanism of the gear 19. The gear 19 will then be clutched to the drive shaft 22 and as it is keyed to the motor shaft, a direct drive will be established between the motor shaft and the pulley 23.

If it is desired to drive the pulley 23 at the next highest speed, the crank or shift handle 36 is operated to place the high point 32 of the clutch control shaft in register with the clutch elements of the gear 46, thus, clutching this gear to the drive shaft 22. As the countershaft is constantly driven from the motor shaft a second speed drive will be established from the motor shaft to the countershaft through the gears 19 and 42 and thence through the pinion 43 to the gear 46, driving the drive shaft 22 and the pulley 23 at a decreased rate of speed.

To drive the pulley 23 at third speed, the high point 32 of the clutch control shaft 30 is placed in register with the clutch elements of the gear 47, clutching this gear to the drive shaft 22 and releasing the clutch of the gear 46. The drive will then be transmitted from the motor shaft through the countershaft to the drive shaft through the medium of the gears 44 and 47.

A still further reduced speed may be accomplished by clutching the gear 48 to the drive shaft by operating the clutch control shaft 30. This gear will be driven by the pinion 45 from the countershaft and the pulley 23 will be driven at a still further decreased rate of speed.

While I have shown but four speeds in the present instance, it is to be understood that additional gears and pinions may be arranged on the drive and countershafts without departing from the spirit of the invention, as it is only necessary to increase the length of these shafts to provide additional speed ratios between the motor and pulley 23.

One of the features of the present invention is that the mechanism is so arranged that the speed of the pulley 23 may be changed from direct drive to low speed or vice versa in one direct operation.

It should be stated that the present transmission is most particularly adapted for use in connection with driving machine tools as it provides a compact power plant for these types of devices. Likewise, the driving speed may be changed within the limits of the transmission from one extreme to the other very quickly.

It is seen that I have arranged the gears of the transmission in a manner that they will be in constant mesh and will at all times be properly lubricated, thus insuring that the wear of the parts will be minimized.

While I have shown the preferred form of my invention, it is to be understood that various changes may be made in its construction by those skilled in the art without departing from the spirit of the invention, as defined in the appended claim.

Having thus described my invention, what I claim and desire to secure by Letters Patent is:

A sectional housing adapted to be attached to an electric motor casing, said housing including aligned outer end, intermediate, and inner end sections, means connecting the adjacent sections, said sections having horizontally aligned openings provided with bearings for receiving the motor shaft and a driven shaft of a multiple speed transmission, said driven shaft extending within the outer end section and adapted to receive a driven member, said outer end section having an open side through which the driven member protrudes, a bearing member mounted on the outer end section, said bearing member having a flange connected to the outer end section, said flange provided with an axially disposed hub extending into the outer end section and abutting one of the bearings on said driven shaft.

ROY T. WISE.